United States Patent Office 2,853,363
Patented Sept. 23, 1958

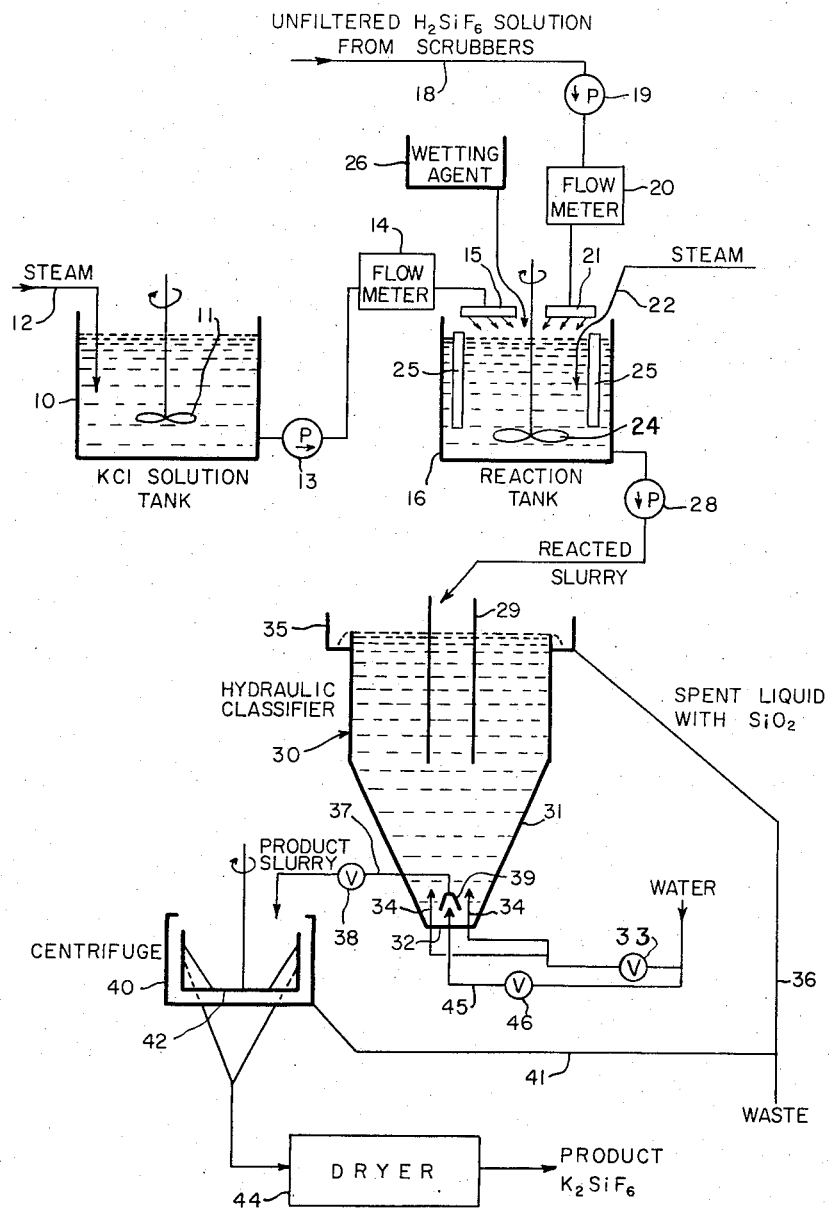

2,853,363

MANUFACTURE OF POTASSIUM SILICOFLUORIDE

William L. Sidun, Scotch Plains, and Maurice E. Brown and Charles H. Milligan, Westfield, N. J., assignors to The American Agricultural Chemical Company, New York, N. Y., a corporation of Delaware Application April 5, 1955, Serial No. 499,474

10 Claims. (Cl. 23—88)

This invention relates to the production of potassium silicofluoride ($K_2SiF_6$), which is also called potassium fluosilicate. Chief aims of the invention are: to afford improved procedure, which may be of an essentially continuous nature, for producing and recovering this compound in an easily handled, crystalline state; and to do so by reaction of fluosilicic acid solution (also called hydro-fluosilicic acid) of such type as may contain silica in suspension, with a reactive potassium compound, most conveniently commercial potassium chloride.

An important source of hydrofluosilicic acid is represented by waste gases containing silicon tetrafluoride, particularly the gases evolved from the manufacture of superphosphate or the like by the treatment of phosphate rock with sulfuric or other acid. Such gases from procedures for acidulation of mineral phosphate are conventionally passed through a scrubber, where their content of combined fluorine, primarily in the form of silicon tetrafluoride, is absorbed, so as to convert the scrubbing water to a solution of hydrofluosilicic acid. The reaction is conveniently represented by the following equation:

$$3SiF_4 + 2H_2O \rightarrow 2H_2SiF_6 + SiO_2 \qquad (1)$$

Recirculation of the acid solution in the scrubber can build the concentration to any desired value, up to a limit of about 25% by weight, and by appropriate control can be kept at any given point or within any given range. The resulting liquor, particularly by virtue of the above reaction, contains undissolved silica ($SiO_2$) in a very fine state of subdivision. For producing potassium silicofluoride from the hydro-fluosilicic acid solution, it is desired to effectuate a reaction with a potassium compound whereby the silicofluoride is precipitated, leaving in solution (or otherwise unprecipitated) the reaction product of the hydrogen of the acid and the anion of the potassium compound. Thus when potassium chloride is used, the reaction is as follows:

$$2KCl + H_2SiF_6 \rightarrow K_2SiF_6 + 2HCl \qquad (2)$$

Unlike the situation of sodium silicofluoride, which is rather readily obtained in a crystalline state, the production of potassium silicofluoride has usually involved some difficulty. In the first place, the potassium compound tends to precipitate only as an extremely fine, and indeed gel-like material, difficult to separate by filtration or otherwise, and difficult to convert to a dry, easily handled form. In the second place, the problem has been aggravated by the presence of fine silica in the acid solution or liquor, making the separation of a substantially pure potassium silicofluoride almost impossible. Retention of silica with the silicofluoride not only constitutes contamination but makes it difficult, by reason of water absorption in the silica, to obtain a dry, free-flowing product. With the view of overcoming these problems, it has heretofore been proposed to clarify the acid solution by special filtration or similar operation before use, and also to employ extremely dilute solutions of potassium chloride with the view of securing a precipitate of somewhat better physical condition. Such procedures, however, involve the inconvenience and expense of an added operation in filtering the acid to remove silica, while the use of the highly dilute potassium salt solution limits the rate of silicofluoride production unless correspondingly large equipment is employed.

The method of the present invention is designed to produce potassium silicofluoride in a very satisfactory physical form with the employment of unfiltered hydrofluosilicic acid and of reactant solutions which may be reasonably concentrated and which permit good efficiency in the use of equipment. At the same time, the method affords a high recovery of fluosilicate values from the acid; an important economic factor in making this product is the achievement of maximum utilization of the acid liquor.

The improved process rests on the discovery that by appropriate continuous introduction of fluosilicic acid solution and of a relatively concentrated solution of the potassium compound into a reaction tank while maintaining a significant amount of seed crystals of potassium silicofluoride in the acqueous, reacting body and while maintaining relatively vigorous agitation of the mass (so as to keep an effective suspension of undissolved materials, viz. the contaminating silica and the crystalline silicofluoride product), the reaction proceeds efficiently, with formation of the potassium silicofluoride in a particle size, e. g. crystals, of substantial magnitude.

The process also includes continuously withdrawing portions of the liquid mixture from the reaction region, i. e. spent liquor containing in suspension both fine silica and relatively sizable crystals of potassium silicofluoride, and continuously subjecting the withdrawn quantities of such mixture to a classifying and solids-recovering operation in a further vessel or tank, a special feature of the invention being the utilization of hindered settling in the last-mentioned step. That is to say, by subjecting the aqueous suspension of potassium silicofluoride crystals and fine silica to the settling operation of the type wherein supplemental liquid (i. e. water) is continuously introduced at the foot of a column or tank, the resultant hindered settling action permits continuous accumulation of the silicofluoride at a lower region of such column or body, but with a sharp classification from the fine silica and the like. The collecting silicofluoride crystals are withdrawn from the bottom of the tank as a more or less concentrated slurry essentially free of silica, while the latter remains in suspension and is separated with the spent liquid, as by overflow from the top of the vessel.

The hindered-settling type of separation for removing the potassium silicofluoride is of special importance to the entire process, in that it is an unusually effective classifying operation for continuously-supplied material and thus makes it feasible to perform the reaction in an essentially continuous manner; indeed only with the defined combination of reacting and product-separating stages are the maximum advantages of the improved continuous-precipitation step realized. Although in some cases other solids-separating operations can be employed to get selective sedimentation, such as the use of ordinary settling in a series of batches, the requisite settling tanks or areas must be relatively large and the process necessarily becomes more prolonged or less easy to control in the attainment of a desirable, substantially pure product.

Successful performance of the reaction stage, for the efficient production of potassium silicofluoride in satisfactory crystalline form, depends in most cases on the observance of certain critical or important conditions, for instance, as to minimum temperature, as to the size characteristics of the body of crystals to be maintained continuously in the reaction zone for the purpose of seed, and as to the employment of agitation. Details of these and other significant factors are brought out in the following, more complete description of the process, which is conveniently set forth in connection with a specific example of a system for performing it in a presently preferred manner.

The accompanying drawing therefore illustrates, in purely diagrammatic form, a system of apparatus arranged to carry out the process, it being understood that structural details of various elements may be of known or conventional character and are therefore not shown.

In the illustrated system a supply of potassium chloride solution is made up in the tank 10, with the aid of agitator 11 and if desired, appropriate heat, supplied by introduction of steam through the pipe 12 or by heating coils or other appropriate means. After contaminating solids in the potassium chloride solution have been allowed to settle in part and in part to float to the surface, the clarified solution is ready for delivery through pump 13 and flow meter 14 to a solution distributing head 15 over the reaction tank 16. The pipe 18 is provided to bring hydrofluosilicic acid solution from a gas scrubbing system or the like (not shown), so that it can be advanced by pump 19 through a flow meter 20 into a distributing head 21, likewise disposed over the reaction tank 16.

The liquid in the reaction tank may be kept at a suitably elevated temperature by appropriate means such as heating coils or by introduction of steam as through the pipe 22. The reaction tank 16 is also provided with agitating means 24, for example of the rotating, open turbine type, which is kept in operation during the entire process, i. e. so long as potassium chloride solution and acid solution are being continuously and simultaneously delivered through the distribution heads 15 and 21. Baffles 25 extending radially inward from the cylindrical wall of the tank at a plurality of circumferentially spaced locations, facilitate the agitating or stirring action in that the turbulence of the liquid is interrupted circumferentially and tends to involve predominantly a top-to-bottom circulation. The liquid is thus kept in a thoroughly mixed and locally turbulent state, more effectively than with a purely circular or vortical type of motion.

Improved operation is achieved by supplying a small proporition of a wetting agent to the reacting body of the tank 16, e. g by continuous or other appropriate feed from a tank 26.

Withdrawal and further treatment of successive quantities of the reaction product are performed as follows: From the bottom of the tank 16, an aqueous slurry comprising potassium silicofluoride crystals, suspended silica and such fine particles of other foreign matter as may be present (the liquid itself being now essentially a solution of hydrochloric acid) is advanced continuously by the pump 28 into the inlet cylinder 29 of a hydraulic classifier generally designated 30. This device may be of any suitable type having provision for hindered settling in a lower region, and is thus shown as having a long cone-shaped lower part 31, i. e. tapering to a relatively narrow bottom 32. As regulated by a valve 33 water is continuously introduced into the foot of the classifier section 31 through a plurality of pipes 34, thus creating upward flow of liquid in the classifier, at a rate which is relatively high in the cone-shaped portion 31, being highest near the bottom and indeed there locally accelerated, so to speak, as it enters. As will be noted, the incoming slurry is fed to a column 29 which has a cross-section much smaller than the tank 30 and which extends suitably down, say about halfway, into the tank. Thus the incoming material is prevented from mixing too quickly with the liquid at the uppermost part of the tank, the result being to afford maximum effectiveness of classifying action whereby the crystalline silicofluoride product accumulates at or near the bottom 32.

By reason of the restricted area through which supplemental water is fed into the tank section 31, and the restricted cross-section of the area of this tank at its lower part, solids settling through the liquid in the tank are hindered as they tend to fall to the bottom. The result is a condition known in the hydraulic classifying art as hindered settling, whereby the column of liquid and suspended solids in the tank portion 31, especially at the lower part thereof, tends to exhibit a density substantially greater than that which characterizes the liquid alone, with the result that particles which are smaller than a certain size or which are inherently characterized by lower settling rates, fail to settle into and through the accumulating larger or faster settling solids. In consequence, an unusually sharp classification of solids is achieved, in this case between the faster settling crystals of potassium silicofluoride and the slower settling, very fine particles of silica and other foreign matter. Inasmuch as all of the liquid introduced into the classifier 30, both in incoming slurry added at the head of column 29 and particularly as provided by the supplemental or so-called hydraulic water introduced through the pipes 34, must flow upwardly around the outside of the column 29 and thus overflow in the channel 35 at the top of the tank, the finer or slower settling matter is carried upward and passes along with the overflowing liquid. This overflowing slurry, thus containing the unwanted fine matter, is discharged to waste through a pipe 36.

The accumulating silicofluoride crystals, as a slurry, are withdrawn through a pipe 37, which opens downwardly into the tank portion 31 near the bottom and can be controlled, for interruption or change in the flow of solids, by a plug valve 38. Under such control, the discharge of product through the pipe 37 can be intermittent or continuous; in either case the operation or adjustment of the valve 38 should be such as to maintain an appropriate body of suspended crystals (i. e. solids standing in so-called teeter) in the lower part of the tank section 31; in this way full advantage is taken of the hindered settling effect and little or none of the fine silica or other finely divided matter traverses the product discharge line 37.

For further separation of liquid from the silicofluoride slurry the latter is fed from the pipe 37 into a centrifuge 40, from which the separated liquid is carried to waste by a further pipe 41. From the basket 42 of the centrifuge the nearly dry crystals can be withdrawn and subjected to further treatment as desired, for example in a heated dryer 44, which discharges a dry, free-flowing product, consisting of potassium silicofluoride of good purity.

Since the principles of operation of hindered settling classifiers are well known, further detail is unnecessary regarding the structure and control of the apparatus 30. As explained above, the chief requirement for delivery of properly classified product involves only such regulation or timing of product discharge (by valve 38) as will avoid depleting the accumulating silicofluoride material in the lower part of the tank section 31 to a point where appreciable contamination with fine particles occurs. The inflow of water through the pipes or jets 34 is controlled by the valve 33 and can be set to afford the desired hindered settling over a considerable range of rates of slurry feed into the column 29. Indeed since the rates of reactant supply and of intermediate product withdrawal relative to the tank 16 may be reasonably constant throughout any period of stabilized operation, only infrequent adjustment may be needed for valve 38 and none for valve 33, especially in that a given input of water through the pipes 34 is capable of affording proper function of the classifier over a wide range of feed rates, with resultant variation only in the volume of the overflow into the channel 35.

At the outset of a run, the starting of a flow of product slurry through the pipe 37 can be facilitated by directing a supplemental flow of water into the submerged downwardly open end 39 of this pipe, e. g. by means of a supplemental pipe or jet 45 receiving water through a control valve 46. Once the suspension of crystals is flowing through the line 37, the valve 46 may be turned off.

The control of the procedure in the reaction tank 16, in accordance with principles explained herein, affords a precipitate of potassium silicofluoride such as to be readily capable of separation by hindered settling or the like as in the classifier 30. The reaction is performed, moreover, in an economical manner and with high recovery of the fluosilicic values in the acid.

The potassium chloride solution is supplied in a relatively concentrated form, the upper limit being a content of approximately 20% by weight, representing a saturated solution. Satisfactory results can be had with solutions in the range of 10% to 20%, the useful minimum being about 8%. While it is conceivably possible to employ very dilute solutions (for example, of the order of 3.5%), the process loses much of its economic advantage especially in that the volumes of liquid to be handled and in consequence the size of the apparatus, will become much larger, with additional operational difficulty and expense, e. g. in the provision of agitation in the reaction tank and in the attainment of hindered settling in the classifying step.

The hydrofluosilicic acid solution should have an appropriately moderate strength, in order to achieve the desired crystal or particle size of the product. It is particularly important to avoid undue concentration, a preferred maximum being about 12% by weight in the supplied aqueous solution. At substantially higher concentrations the reaction tends to become unstable, in that the potassium silicofluoride precipitate becomes too fine (e. g. rising to a point where more than 50% would pass a standard 200 mesh screen); such difficulty is understood to arise as a concentration of 15% is exceeded. For certainty of results, it appears better to keep the acid concentration below 15%, an operating optimum being generally about 10%. While there appears to be no lower limit of concentration from the standpoint of product crystal size, economical operation dictates the avoidance of extremely dilute acid solutions, the preferred minimum being thus a value of at least about 5%. Ordinarily, the acid concentration can be regulated to a value in the range of 6% to 12%, corresponding approximately to strength from 6° Baumé to 11° Baumé. It will be understood that the acid ordinarily contains free suspended silica in proportions varying with the acid concentration and corresponding to the decomposition Reaction 1 hereinabove.

The temperature in the reacting body of liquid appears particularly important, i. e. in that unless the heat is maintained, fines increase in number to the point of objectionable excess in the silicofluoride precipitate. The elevated temperature (very preferably 120° F. or higher) is maintained by appropriate heating means as explained above for the tank 16, the maintenance of temperature being advantageously further facilitated (if desired) by heating the potassium salt solution. Optimum results from the standpoint of crystal size and economy of operating expense have been achieved within a temperature range of 120° F. to 130° F., although otherwise than in the matter of expense of supplying heat, there appears to be no critical upper limit even into the range of temperatures above normal boiling point where a pressure vessel would be required. Ordinarily, however, no advantage has been noted in allowing the temperature to exceed, say, 140° F. or thereabouts. At temperatures very substantially below 120° F., the operation has been found to become unstable with respect to particle size; indeed at temperatures appreciably below about 115° F., the proportion of product particles (by weight) becoming finer than 200 mesh tends to rise to values of about 50% or higher.

For practical attainment of the desired results, the hydrofluosilicic acid solution and the potassium salt solution are delivered to the reaction vessel in approximately stoichiometric proportion, the control to that end being effected in a suitable way as by the flow meters 14 and 20. While modest departures from this relation can be tolerated (e. g. to the extent of 10% in either direction) reasons of efficiency will ordinarily dictate the avoidance of excess acid; such excess merely represents a waste of silicofluoride values. By the same token, it appears unnecessary to employ any substantial excess of the potassium chloride; although the use of a large excess may not be harmful to the quality of the product, a preferred feature of the invention is the avoidance of such excess and the consequent avoidance of any necessity for recovery of potassium chloride from the spent reaction liquid. Thus the preferred operation may be defined as supplying the reactants in substantially stoichiometric amounts, such characterization embracing the use of a slight excess of the potassium salt, say at most 2% or 3% (i. e. less than 5%), as may be necessary to insure full utilization of the acid. Convenient control of the process is to sample the mixing tank 16 at suitable intervals. After allowing time for the reaction to become complete in the sample, it is tested for hydrofluosilicic acid content. If such acid is present in appreciable amount, it is apparent that the potash supply is low, and accordingly the input rate of potassium chloride solution is raised by appropriate adjustment.

In order to achieve proper operation, at economically high rates of reactant feed, it is important to maintain a body of silicofluoride crystals in suspension in the reacting liquid mass at all times, such body constituting seed crystals for the continuing precipitation reaction. Thus at the outset there should be incorporated a quantity of such crystals, for instance by adding them to the initial body of clear water with which the operation in tank 16 is started. Alternatively if such seed crystals are not available, the initial stage of the reaction may be specially controlled to build up a body of such crystals, as by introducing the reactant fluids at a much slower rate than employed for continuing operation. Thereafter, in either case, a suspension of crystals is maintained in the reaction body, the agitation and the withdrawal of intermediate product slurry being such as to maintain this condition.

In general the object is to provide a potassium silicofluoride product such that as many of its particles as possible are larger than 200 mesh (e. g. referring to the conventional screen size of this value). Originally as seed crystals, or continuing in effect as seed crystals, the suspend silicofluoride particles in the reaction mixture should not be such as to have more than about 50% passing 200 mesh. A preferred size for seed crystals at the outset is that there be not more than about 10% through 200 mesh; although the above indicated maximum of fines is in many cases tolerable from the beginning, it is greatly preferred to keep the particle size such that not more than 30% passes 200 mesh. When the suspended crystals include more than 50% of fines (minus 200 mesh), a considerable amount of product is lost in the subsequent classifying stage. Moreover, as indicated above, the difficulty of growing crystals on the very fine particles then increases and indeed the process tends to become unstable in that the percentage of fines rises to the point where the operation must be interrupted. For practical efficiency, effort is made to keep the fines in the range of 20% to 30%, as may be achieved by maintaining the various significant conditions within the preferred limits described elsewhere herein.

It is particularly important to maintain thorough agitation in the reaction tank 16, for example in the manner shown. The sole criterion is to keep a substantially uniform suspension throughout the reaction mass, especially to take account of the fact that the potassium silicofluoride is relatively dense and heavy and tends to settle rather quickly. In a more general sense the function of agitation is to insure that the suspended particles of silicofluoride in the liquor (including those freshly precipitating or growing by precipitative accretion) are such that not more than about 50% and preferably not more than 30% are finer than 200 mesh. Indeed so long as these conditions are satisfied as to the solids actually in suspension it would appear that some settling or accumulation of larger crystals near the bottom of the tank could be tolerated if unavoidable.

As explained above, the classifying stage involving hindered settling is specially related to the described reaction step, in providing an efficient and sharp separation of the silicofluoride product from the suspended silica, and in functioning continuously in the same manner as the continuous performance of the reaction. Indeed the hydraulic classifying stage is unusually desirable in its ready adaptation to variations in rate of the reaction step, i. e. even should there be varying delivery of intermediate product slurry to the classifier. Although in some cases other or supplemental settling operations may be employed (for instance as by using a secondary hindered-settling tank to which the product slurry from the tank 30 is supplied as feed), a single classifier appears generally adequate for good practical results.

Final separation of liquid from the substantially silica-free slurry of silicofluoride crystals delivered through the pipe 37 can be achieved in various ways, e. g. settling, filtration, centrifuging and ultimate drying by evaporation (with intermediate washing if desired for greater purity); the illustrated succession of a centrifuge and dryer is merely given as an effective, practical example of the subsequent operations.

The following is a specific example of the process. Using a cylindrical tank 10 having a diameter of 9 feet and height of 7 feet, water is introduced to a height of 6 feet and heated to 125° F. While the agitator 11 is operated, 3000 pounds of commercial grade (58 to 63% $K_2O$) potassium chloride are introduced; agitation is continued until the salt is fully dissolved. Agitation is then interrupted and the solution is allowed to stand, usually for several hours, to become clear. Most of the foreign matter which usually accompanies the commercial salt settles to the bottom, while some floats at the top; separation of this insoluble foreign matter that usually accompanies commercial potassium chloride can also be accelerated, if desired, by filtration.

Assuming that no separately prepared potassium silicofluoride crystals are available as initial seed for the reaction, the operation in the mix or reaction tank 16 is initiated as follows. Using a cylindrical tank 7 feet in diameter and 7 feet deep, water is first added to a depth of 3 feet and the agitator is started and heat applied to raise the water to a temperature of 130° F. It is assumed that unfiltered hydrofluosilicic acid is available in the pipe 18, having a strength, say, of about 10% (in aqueous solution) and containing free suspended silica as explained above. While maintaining agitation in the tank 16, pumps 13 and 19 are started but with the feed rate reduced to a relatively very slow value. Thus the clear potassium chloride solution and the unfiltered acid liquor are slowly delivered to the water in the tank 16, preferably each in distributed form over the top of the tank so as to afford optimum, uniform mixing. For best preparation of crystals (both initially and during a run) the reactants are always added simultaneously. The distribution of reactants is preferably such that each is highly dispersed in the liquid before or not later than the time of contact with the other.

To prepare seed crystal, the hydrofluosilicic acid solution is initially fed at the rate of 30 gallons per hour and the potassium chloride solution at a rate providing stoichiometric balance with the acid. Such feed of the reactants is continued until approximately 300 pounds of seed crystal of potassium silicofluoride are produced in the mix tank, the agitation and heating being continued as explained above. Under these conditions, it is possible to produce the seed crystal in a particularly satisfactory form, having maximum of about 10% through 200 mesh.

As also explained, it is desirable, although not absolutely necessary, to feed a small amount of a wetting agent in the reacting zone along with the reactants, preferably from the outset. The purpose of such agent is to reduce surface tension and make crystals of potassium silicofluoride more readily available for growth. The wetting agent should be fed at a rate sufficiently slow, so that no foam would form on the slurry in the mix tank when agitation is stopped. Various wetting agents may be employed, such as the aryl akyl sulfonates, or any other substance that will reduce surface tension. Suitable examples of commercially available agents are Udet, Ultrawet and Nacconol.

With seed crystal provided as explained above, the level of liquor in the tank 16 is adjusted as by adding water, if necessary, to make it about two-thirds full or to a level of 4 feet. It may here be explained that if a separate supply of potassiums silicofluoride seed crystals of suitable particle size (say, not more than 20% minus 200 mesh) is available, the operation may be started simply by introducing water and the seed crystals in the tank, and by heating the tank to the appropriate temperature.

In either case with seed crystals established, the regular run of the reaction is then initiated, in a continuous manner, by operating the salt and acid feed pumps 13 and 19 respectively while keeping full agitation in the tank and supplying heat to keep the temperature in the range of 120° to 130° F. thereafter. As soon as full feed of reactants is under way, the discharge pump 28 is started, withdrawing slurry from the bottom of the tank, at a rate to keep the tank level at about 4 feet. In the continuing operation, the acid feed rate is adjusted to about 700 gallons per hour and the potassium chloride solution is fed at a corresponding rate such as to provide approximately stoichiometric balance therewith in the reaction zone, the reactants thus being supplied in substantially stoichiometric proportions. With a substantial body of crystals always maintained in suspension in the tank (e. g. such that not more than about 20% to 30% will pass 200 mesh) by the continuing agitation, the relatively rapid but dispersed input of reactant solutions affords continuing precipitation and growth of precipitate so that there is continuous production of potassium silicofluoride in crystalline form, having the described particle size characteristics.

The slurry continuously drawn from the bottom of the tank 16 by the pump 28 represents, in substantially completely reacted form, the result of the first stage; it is a liquor which contains hydrochloric acid in solution, substantially free of hydrofluosilicic acid, and carries in suspension the produced potassium silicofluoride crystals and also the fine, free silica which originated with the acid.

The classifier tank 30 being initially filled with water, and the jets 34 being operated to effectuate upward flow from the bottom of the tank, the continuing feed of the intermediate product slurry into the column 29, gives rise to classifying action as described above. The potassium silicofluoride crystals tend to settle immediately, but as their settled volume accumulates, the hindered-settling function comes into play. While the actual settling rate of the salt crystals is thus somewhat diminished, the effect is also such as to impede practically all settling of the lighter or finer silica, so that the latter is carried up to the overflow 35 and then removed to waste. The incoming water through the pipes 34 serves the further function of washing hydrochloric acid from the product crystals in a satisfactory manner as they settle.

Through the line 37 a slurry of the product crystals is withdrawn, either continuously or at intermittent intervals, as may be desired. Ordinarily better operation is achieved if the withdrawal is so regulated as always to keep some loose accumulation of settled crystals in and near the bottom of the tank portion 31 and extending above the openings of the jet pipes 34.

In the centrifuge 40, most of the liquid is removed from the slurry of product crystals, and if desired, the remaining moisture or dampness may be separated in a suitable dryer 44, as with moderate heat.

The product is a potassium silicofluoride of relatively high purity, having good physical properties, including avoidance of excessive fines. Analysis of a representative specimen of product made in accordance with this example showed (by weight):

| | Percent |
|---|---|
| Moisture | .08 |
| Water insol | .20 |
| $H_2SiF_6$ | Trace |
| $K_2SiF_6$ | 99.13 |
| Chlorine | .04 |
| Screen test: | |
| Held on 60 mesh | 2.2 |
| Held on 100 mesh (−60, +100) | 26.2 |
| Held on 200 mesh (−100, +200) | 47.4 |
| Pan (−200) | 24.2 |

Although potassium chloride is particularly preferred as a convenient and relatively inexpensive reagent (so that the invention in a specific aspect is related to the use of such salt), it may be noted that other reactive potassium compounds may be employed, i. e. water soluble, ionizing compounds of potassium, such as potassium hydroxide, and other potassium salts. Tests indicated that effective reaction with hydrofluosilicic acid for producing potassium silicofluoride in a manner and with the advantages of the present process, may be achieved with a wide variety of reactive compounds of potassium, particular examples being potassium nitrate, potassium sulfate, potassium carbonate and potassium hydroxide. Indeed potassium carbonate and potassium hydroxide not only showed a good recovery but have the further advantage of yielding a spent liquid which is substantially free of any acid. These compounds, however, are considerably more expensive than potassium chloride.

It will now be seen that the present process affords an economical and conveniently continuous mode of producing potassium silicofluoride, yielding an easily recovered product with good purity and good physical form. The operation, moreover, permits substantially complete utilization of the fluosilicic acid liquor, such as is available as a by-product in phosphate plants.

It is to be understood that the invention is not limited to the specific examples herein disclosed but may be carried out in other ways without departure from its spirit.

We claim:

1. In the manufacture of potassium silicofluoride, the procedure comprising supplying to a body of aqueous liquid successive quantities of a solution of a reactive potassium compound of a concentration of said compound of at least 8%, and of aqueous hydrofluosilicic acid solution containing suspended silica material, to constitute in said liquid body an aqueous liquid mixture reacting to precipitate potassium silicofluoride, while maintaining seed crystals of potassium silicofluoride continuously in suspension in said liquid body and maintaining the liquid body at a temperature of at least about 115° F., to effect said precipitation of silicofluoride in crystalline form and particle size such that at least 50% of the produced potassium silicofluoride crystals are larger than 200 mesh, and recovering successive quantities of potassium silicofluoride crystals from the liquid body by withdrawing successive quantities of liquid carrying said last-mentioned crystals, said maintaining of the seed crystals in suspension being effected by agitating the liquid body to keep a substantially uniform suspension, throughout said liquid body, of potassium silicofluoride crystals having particle size such that at least 50% are larger than 200 mesh.

2. In the manufacture of potassium silicofluoride, the procedure comprising establishing a quantity of seed crystals of potassium silicofluoride in suspension in aqueous liquid, said seed crystals having at least 50% thereof larger than 200 mesh, reacting hydrofluosilicic acid in aqueous solution containing suspended silica material, with a reactive potassium compound in solution, in the presence of said seed crystals in said aqueous liquid and while agitating the reacting liquid, to produce precipitated crystals of potassium silicofluoride having particle size such that at least 50% are larger than 200 mesh, said potassium compound being supplied in aqueous solution in a concentration of said compound of at least about 8% therein, transferring the liquid carrying the produced potassium silicofluoride crystals to a settling region and there settling the said crystals while maintaining the silica material in suspended condition, and removing the settled potassium silicofluoride crystals from said settling region, said agitation of the aqueous liquid being effected to maintain a substantially uniform suspension, throughout the entire body of said aqueous liquid, of potassium silicofluoride crystals having particle size such that at least 50% are larger than 200 mesh.

3. Procedure as defined in claim 2, wherein the step of establishing the potassium silicofluoride seed crystals comprises establishing a body of aqueous liquid and slowly feeding into said liquid hydrofluosilicic acid solution and a solution of a potassium salt, said acid and salt being supplied in substantially stoichiometric proportion, while agitating the liquid, for reaction of said acid and salt to produce a precipitate of potassium silicofluoride crystals.

4. Procedure as defined in claim 2, in which the transfer of the liquid carrying the potassium silicofluoride crystals and the settling of said crystals comprises introducing the liquid containing said crystals and silica in suspension, to a settling region, while maintaining said region substantially filled with aqueous liquid and while maintaining hindered settling in a lower part of said region by introducing aqueous liquid to flow upwardly therein, and by said hindered settling, effecting accumulation of the potassium silicofluoride crystals at a lower part of said region and inhibiting the settling of the silica material to said last-mentioned lower part, separating the liquid and silica material from an upper locality of said settling region and removing accumulated potassium silicofluoride crystals substantially free of silica material from said last-mentioned lower part of the settling region.

5. In the manufacture of potassium silicofluoride, the procedure comprising reacting hydrofluosilicic acid in aqueous solution containing suspended silica material with a reactive potassium compound in solution, while maintaining seed crystals of potassium silicofluoride in the liquid mixture having a major proportion thereof larger than 200 mesh and while agitating the mixture to keep said seed crystals in substantially uniform suspension throughout the entire body of said liquid mixture and while maintaining the mixture at a temperature of at least about 115° F., to produce potassium silicofluoride in precipitated crystalline form, said potassium compound being introduced in dissolved concentration of at least about 8%, transferring liquor carrying the produced potassium silicofluoride crystals and containing silica material in suspension, to a setling region, and in said region and under the influence of hindered settling effectuated by directing a flow of liquid upwardly in said region, settling the produced silicofluoride crystals to a lower part while maintaining the silica material in suspension, and removing said produced crystals and liquid containing said silica material respectively from lower and upper parts of said settling region.

6. In the manufacture of potassium silicofluoride, the procedure comprising establishing a body of aqueous liquid containing seed crystals of potassium silicofluoride, supplying successive quantities of potassium chloride solution having a concentration of at least about 8% KCl and of hydrofluosilicic acid solution containing suspended silica material to said body of aqueous liquid, for reaction to provide crystalline precipitation of potassium silicofluoride in particle size such that at least 50% of the crystals are larger than 200 mesh, said acid and potassium chloride being supplied simultaneously and in substantially stoichiometric proportion while agitating said body of liquid to keep the seed crystals in substantially uniform suspension throughout said body of liquid, transferring liquor carrying produced potassium silicofluoride crystals and containing silica material in suspension, to the upper part of a settling region while maintaining said region substantially filled with aqueous liquid, maintaining hindered settling in a lower part of said region by introducing upward flow of aqueous liquid therein for effectuating settling of the silicofluoride crystals toward the foot of said lower part while inhibiting settling of the silica material by said hindered settling, separating liquid and silica material from an upper locality of the region and removing silicofluoride crystals substantially free of silica material from said foot of the lower part of the region.

7. Procedure as described in claim 6, wherein said establishment of seed crystals of potassium silicofluoride is effectuated by supplying solutions of potassium chloride and hydrofluosilicic acid simultaneously to a body of aqueous liquid at a slow rate while agitating said body of liquid, the supply thereafter of acid and potassium chloride solution to said body containing the seed crystals, being effected at a much faster rate, for yield of the aforesaid produced silicofluoride crystals, than said initial supply of acid and chloride solution to establish the seed crystals.

8. In the manufacture of potassium silicofluoride, the procedure comprising establishing in a reaction region a quantity of seed crystals of potassium silicofluoride having a major proportion thereof larger than 200 mesh, supplying to said reaction region successive quantities of a solution of a reactive potassium compound of a concentration of said compound of at least about 8%, and of hydrofluosilicic acid solution having a concentration of 5% to 15% and containing suspended silica material, to provide in said region a liquid mixture reacting to effect crystalline precipitation of potassium silicofluoride in particle size such that at least 50% of the crystals are larger than 200 mesh, said acid and potassium compound solutions being supplied simultaneously and in substantially stoichiometric proportion while agitating the liquid mixture to maintain potassium silicofluoride crystals in substantially uniform suspension throughout the entire body of said liquid mixture for continuing purposes of seed and while maintaining the liquid mixture at a temperature of at least about 120° F., and recovering successive quantities of potassium silicofluoride crystals from the liquid mixture.

9. In the manufacture of potassium silicofluoride, the procedure comprising establishing in a reaction region a quantity of seed crystals of potassium silicofluoride having a particle size such that at least 70% are larger than 200 mesh, continuously supplying to said reaction region solutions of potassium chloride and of hydrofluosilicic acid to provide a reacting liquid mixture carrying said seed crystals, the supplied potassium chloride solution having a concentration of at least about 8% KCl and the supplied acid solution having an acid content of 5% to 15% and containing suspended silica material, said solutions being supplied while agitating the liquid mixture to maintain substantially all solids in substantially uniform suspension throughout the entire body of said liquid mixture and while maintaining a temperature of at least about 120° F., said acid and potassium chloride solutions being supplied simultaneously and reacting to provide crystalline precipitation of potassium silicofluoride in particle size such that more than 50% of the crystals are larger than 200 mesh, continuously withdrawing from said region a slurry comprising reacted liquid and potassium silicofluoride crystals and silica in suspension, and subjecting the withdrawn slurry to settling operation for separation of potassium silicofluoride crystals from the silica.

10. Procedure as described in claim 9, wherein the settling operation comprises introducing the aforesaid slurry continuously into a settling region filled with aqueous liquid while supplying aqueous liquid continuously at a lower part of said region to effectuate hindered settling in and above said lower part for accumulation of potassium silicofluoride crystals by settling in said lower part while maintaining silica in suspension in the aqueous liquid, withdrawing silicofluoride crystals from the foot of said settling region and withdrawing aqueous liquid carrying silica in suspension from an upper part of said region.

References Cited in the file of this patent

UNITED STATES PATENTS

| | | |
|---|---|---|
| 1,559,703 | Howard | Nov. 3, 1925 |
| 1,814,300 | Duschak | July 14, 1931 |
| 2,447,359 | Oakley | Aug. 17, 1948 |
| 2,556,064 | Caldwell et al. | June 5, 1951 |

UNITED STATES PATENT OFFICE
Certificate of Correction

Patent No. 2,853,363 September 23, 1958

William L. Sidun et al.

It is hereby certified that error appears in the printed specification of the above numbered patent requiring correction and that the said Letters Patent should read as corrected below.

Column 8, line 13, for "akyl" read —alkyl—; line 49, after "drawn" insert —of—; column 9, line 58, after "least" insert —about—; column 10, line 65, for "setling" read —settling—.

Signed and sealed this 28th day of April 1959.

[SEAL]

Attest:
T. B. MORROW,
*Attesting Officer.*

ROBERT C. WATSON,
*Commissioner of Patents.*